United States Patent
Kang et al.

(10) Patent No.: US 10,961,337 B2
(45) Date of Patent: Mar. 30, 2021

(54) METHOD OF PREPARING DICYCLOPENTADIENE-BASED RESIN AND DICYCLOPENTADIENE-BASED RESIN

(71) Applicant: HANWHA CHEMICAL CORPORATION, Seoul (KR)

(72) Inventors: Hyeon Uk Kang, Seoul (KR); Pil Je Seong, Daejeon (KR); Kyong Jun Yoon, Daejeon (KR); Hee Jin Jang, Seoul (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 74 days.

(21) Appl. No.: 16/465,664

(22) PCT Filed: Dec. 11, 2017

(86) PCT No.: PCT/KR2017/014471
§ 371 (c)(1),
(2) Date: May 31, 2019

(87) PCT Pub. No.: WO2018/110918
PCT Pub. Date: Jun. 21, 2018

(65) Prior Publication Data
US 2019/0309114 A1    Oct. 10, 2019

(30) Foreign Application Priority Data

Dec. 12, 2016 (KR) .......... 10-2016-0168860
Sep. 25, 2017 (KR) .......... 10-2017-0123723

(51) Int. Cl.
C08F 232/08 (2006.01)
C08F 212/08 (2006.01)
C08F 8/06 (2006.01)

(52) U.S. Cl.
CPC .............. *C08F 232/08* (2013.01); *C08F 8/06* (2013.01); *C08F 212/08* (2013.01); *C08F 2800/20* (2013.01)

(58) Field of Classification Search
CPC .......... C08F 232/08; C08F 8/06; C08F 2/001; C08F 212/08; C08F 8/04; C08F 212/12; C08F 2800/20; C08F 236/10; C09J 145/00; C08J 145/00; C08L 53/02

USPC .......................................................... 526/65
See application file for complete search history.

(56) References Cited

U.S. PATENT DOCUMENTS

| 5,502,140 | A | * | 3/1996 | Daughenbaugh et al. ...... 526/283 |
| 5,739,239 | A |   | 4/1998 | Daughenbaugh et al. |
| 6,040,388 | A |   | 3/2000 | Nishimura et al. |

FOREIGN PATENT DOCUMENTS

| CN | 1183420 | 6/1998 |
| CN | 100374398 | 3/2008 |
| EP | 0708121 | 4/1996 |
| JP | H0251502 | 2/1990 |
| JP | H05194629 | 8/1993 |
| JP | 11-130820 | 5/1999 |
| JP | 2004-359964 | 12/2004 |
| JP | 2004-359965 | 12/2004 |
| JP | 3934053 | 6/2007 |
| KR | 10-1999-0082795 | 11/1999 |
| KR | 10-2003-0020385 | 3/2003 |
| KR | 10-2014-0126175 | 10/2014 |
| KR | 10-1590998 | 2/2016 |
| KR | 10-2016-0055085 | 5/2016 |
| TW | 464657 | 11/2001 |
| WO | 1988-003538 | 5/1988 |
| WO | 2016-072818 | 5/2016 |

OTHER PUBLICATIONS

WIPO, A PCT Search Report & Written Opinion of PCT/KR2017/014471 dated Apr. 16, 2018.
EPO, Extended European Search Report of EP 17881240.0 dated Jun. 23, 2020.

* cited by examiner

*Primary Examiner* — William K Cheung
(74) *Attorney, Agent, or Firm* — Lex IP Meister, PLLC

(57) ABSTRACT

Provided are a method of preparing a dicyclopentadiene-based resin and a dicyclopentadiene-based resin. According to the present invention, provided is a dicyclopentadiene-based resin including an aromatic olefin-based comonomer as a comonomer to have improved quality including high compatibility, a favorable color characteristic, and a low softening point, and also having improved adhesive strength due to a low molecular weight and a narrow molecular weight distribution.

11 Claims, No Drawings

METHOD OF PREPARING DICYCLOPENTADIENE-BASED RESIN AND DICYCLOPENTADIENE-BASED RESIN

BACKGROUND OF THE INVENTION

(a) Field of the Invention

The present application is based on, and claims priority from, Korean Patent Application No. 10-2016-0168860, filed on Dec. 12, 2016, and Korean Patent Application No. 10-2017-0123723, filed on Sep. 25, 2017 the inventions of which are hereby incorporated by reference herein in their entirety.

The present invention relates to a method of preparing a dicyclopentadiene-based resin, and a dicyclopentadiene-based resin.

(b) Description of the Related Art

A dicyclopentadiene (DCPD) resin is a resin prepared by thermal polymerization, and is mixed with various polymers, such as amorphous polyalphaolefin (APAO), ethylene vinyl acetate (EVA), styrenic block copolymers (SBCs), etc., to be used as a tackifying resin for adhesive/sticking agents. In this regard, the dicyclopentadiene resin is required to have various physical properties according to the kind and use of the adhesive/sticking agents, and in order to satisfy these physical properties, many studies have been actively performed to improve its compatibility with polymers and to improve adhesive strength.

For example, U.S. Pat. Nos. 5,502,140 and 5,739,239 disclose a copolymer prepared by thermal polymerization of styrene and/or α-methyl styrene (AMS) as a comonomer and a method of hydrogenating the copolymer. In Examples of these patents, use of higher levels of styrene produces resin products with an undesirable high molecular weight, and use of AMS rather than styrene is considered desirable. However, due to the relatively low reactivity of AMS, relative to other vinyl aromatics such as styrene, only about 50% of the AMS in the starting charge is consumed during the thermal reaction, showing low yield of 50% or less. Therefore, a method of extending the reaction time, a method of increasing the reaction temperature, or a method of recycling the unreacted remainder back into the process may be adopted. These methods may increase the yield, but there is a problem that a molecular weight distribution is broadened or productivity is decreased.

Further, colors of resins produced from DCPD and AMS are often undesirably dark. Hydrogenation of DCPD resins is performed to saturate olefin unsaturation and to improve the color characteristic. However, there are problems that a requirement of hydrogen consumption is high and an excessive hydrogenation time is required.

Accordingly, it is necessary to prepare DCPD resins having an aromatic comonomer content appropriate to improve compatibility of the resins and having improved color characteristic and productivity.

JP 3934053 discloses a DCPD resin containing 5% by weight to 23% by weight of styrene and having improved color characteristic by controlling a feeding rate and a reaction rate of DCPD and styrene, and a preparation method thereof. However, this method is also disadvantageous in that it is necessary to control complex process conditions, productivity is low, and a DCPD resin having a wide molecular weight distribution of 2.3 or more is produced to have low adhesive strength.

SUMMARY OF THE INVENTION

To solve the above problems, the present invention provides a method of preparing a dicyclopentadiene-based resin including a proper amount of an aromatic olefin-based comonomer, the method inhibiting an excessive crosslinking reaction and showing high productivity.

Further, the present invention provides a dicyclopentadiene-based resin including an aromatic olefin-based comonomer as a comonomer to have improved quality including high compatibility, a favorable color characteristic, thermal stability, and a low softening point, and also having improved adhesive strength due to a low molecular weight and a narrow molecular weight distribution.

To solve the above problems, according to one embodiment of the present invention, provided is a method of preparing a dicyclopentadiene-based resin, the method including:

a first polymerization step of performing a polymerization process of a monomer composition including dicyclopentadiene and an aromatic olefin-based comonomer at a weight ratio of 90:10 to 10:90 under stirring; and a second polymerization step of performing a polymerization process of reaction products of the first polymerization step without stirring.

According to another embodiment of the present invention, provided is a dicyclopentadiene-based resin which is prepared by polymerization of a monomer composition including dicyclopentadiene and an aromatic olefin-based comonomer at a weight ratio of 90:10 to 10:90 and satisfies the following Equation 1:

$$0.1 < PDI - 1.45*n < 1.3 \quad \text{[Equation 1]}$$

wherein PDI represents a molecular weight distribution of the dicyclopentadiene-based resin, and n represents a weight ratio of the aromatic olefin-based comonomer in the monomer composition (a weight of the aromatic olefin-based comonomer/a total weight of the monomer composition).

According to the method of preparing the dicyclopentadiene-based resin of the present invention, polymerization of dicyclopentadiene and the aromatic olefin-based comonomer is performed in two stages. In the first polymerization step, continuous mixing and reaction of monomers are performed, and in the second polymerization step, polymerization is continued while inhibiting a crosslinking reaction, thereby preparing the dicyclopentadiene-based resin having high productivity and a lower molecular weight and a narrower molecular weight distribution than known dicyclopentadiene-based resins.

Further, the dicyclopentadiene-based resin prepared by the above polymerization process has a relatively low molecular weight and narrow molecular weight distribution, as compared with the known dicyclopentadiene-based resin having a similar content of the aromatic olefin-based comonomer, and therefore, the dicyclopentadiene-based resin may exhibit excellent adhesive strength while maintaining thermal stability and compatibility, and may exhibit a low softening point and a favorable color characteristic.

DETAILED DESCRIPTION OF THE EMBODIMENTS

As used herein, the term 'dicyclopentadiene-based resin' refers to a resin polymerized by using dicyclopentadiene as a monomer, or together with other comonomer, and also includes a hydrogenated resin obtained by hydrogenation of the resin.

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention may be variously modified and have various forms, and specific examples of the present invention are explained in this description. However, it is not intended to limit the present invention to the specific examples and it must be understood that the present invention includes every modifications, equivalents, or replacements included in the spirit and technical scope of the present invention.

Hereinafter, a method of preparing a dicyclopentadiene-based resin, and a dicyclopentadiene-based resin of the present invention will be described in more detail.

The method of preparing the dicyclopentadiene-based resin according to one embodiment of the present invention may include a first polymerization step of performing a polymerization process of a monomer composition including dicyclopentadiene and an aromatic olefin-based comonomer at a weight ratio of 90:10 to 10:90 under stirring; and a second polymerization step of performing a polymerization process of reaction products of the first polymerization step without stirring.

Further, the dicyclopentadiene-based resin according to another embodiment of the present invention may be prepared by polymerization of the monomer composition including dicyclopentadiene and the aromatic olefin-based comonomer at a weight ratio of 90:10 to 10:90, and may satisfy the following Equation 1:

$$0.1 < PDI - 1.45*n < 1.3 \quad \text{[Equation 1]}$$

wherein PDI represents a molecular weight distribution of the dicyclopentadiene-based resin, and n represents a weight ratio of the aromatic olefin-based comonomer in the monomer composition (a weight of the aromatic olefin-based comonomer/a total weight of the monomer composition).

In Equation 1, when $PDI-1.45*n$ is expressed as z, it may satisfy $0.1<z<1.3$, or $0.3<z<1.3$, or $0.5<z<1.3$, or $0.5<z<1.25$, or $0.8<z<1.25$, or $1.0<z<1.25$.

In the case of a dicyclopentadiene-based resin having the same weight ratio of the aromatic olefin-based comonomer, a smaller z value of Equation 1 means a narrower molecular weight distribution. The dicyclopentadiene-based resin prepared by the preparation method of the present invention has a narrow molecular weight distribution, as compared with a known dicyclopentadiene-based resin having the same content of the aromatic olefin-based comonomer, thereby exhibiting excellent adhesive strength while maintaining high compatibility.

The dicyclopentadiene resin is mixed with various polymers to be widely used as a tackifying resin for adhesive/sticking agents. In this regard, the dicyclopentadiene resin is required to have various physical properties according to the kind and use of the adhesive/sticking agents, and a copolymerized resin obtained by using an aromatic olefin-based comonomer compound as a comonomer is suggested to improve compatibility with polymers and to improve adhesive strength.

However, it is not easy to prepare a resin having a low molecular weight and a narrow molecular weight distribution favorable to adhesive strength by copolymerizing dicyclopentadiene together with the aromatic olefin-based comonomer with high productivity.

Accordingly, the present inventors found that during preparation of the dicyclopentadiene-based resin including the aromatic olefin-based comonomer as a comonomer, polymerization is carried out in two stages, and at each stage, stirring is controlled, thereby preparing high-quality dicyclopentadiene-based resin with a high yield, leading to the present invention.

More specifically, in the first polymerization step, the first polymerization is performed by feeding and mixing the monomer composition until a conversion rate of dicyclopentadiene reaches a predetermined level. Subsequently, in the second polymerization step, reaction products of the first polymerization step are subjected to second polymerization without stirring. As a result, side-reactions such as homopolymer production, etc. are prevented to prepare a high-quality dicyclopentadiene-based resin having a narrow molecular weight distribution. That is, in the first polymerization step, side-reactions such as polystyrene production, etc. may be prevented by effective mixing of the polymerization raw materials, and in the second polymerization, a reaction rate may be increased, thereby preventing overall side reactions and increasing the reaction rate of the dicyclopentadiene and the aromatic olefin-based comonomer.

In the method of preparing the dicyclopentadiene-based resin of the present invention, the monomer composition as the raw material may include dicyclopentadiene and aromatic olefin-based comonomer at a weight ratio of 90:10 to 10:90, 80:20 to 20:80, 70:30 to 30:70, or 50:50 to 30:70.

To provide dicyclopentadiene resins with thermal stability, compatibility with other resins, and color characteristics, copolymerization with comonomers is widely used.

The aromatic olefin-based comonomer which may be used in the present invention may include styrene; a styrene derivative such as α-methyl styrene (AMS), p-methyl styrene, etc.; indene; an indene derivative such as methyl indene, etc.; toluene; a toluene derivative such as vinyl toluene, etc.; C9-based monomers produced by thermal cracking of naphtha; or a mixture thereof, but the present invention is not limited thereto.

As a content of the aromatic olefin-based comonomer in the dicyclopentadiene-based resin is higher, compatibility with other base resins may be improved, but the molecular weight distribution may be broadened, which may reduce adhesive strength of the resin. For this reason, it is necessary to control the molecular weight distribution below a predetermined level.

According to the method of preparing the dicyclopentadiene-based resin of the present invention, it is possible to prepare the dicyclopentadiene-based resin having a low molecular weight and a narrow molecular weight distribution by inhibiting crosslinking reaction while having a high content of the aromatic olefin-based comonomer.

According to one embodiment of the present invention, in the first polymerization step, the monomer composition including dicyclopentadiene and the aromatic olefin-based comonomer may be subjected to a polymerization reaction at a reaction temperature ($t_1$) of 210° C. to 270° C.

In this regard, the weight ratio of dicyclopentadiene and the aromatic olefin-based comonomer in the monomer composition may be 90:10 to 10:90, or 80:20 to 20:80, or 70:30 to 30:70, or 50:50 to 30:70. If the amount of the aromatic olefin-based comonomer is too small, the quality improvement of the resin may not be satisfactory, and if the amount of the aromatic olefin-based comonomer is too large, the cost required for the hydrogenation process may be increased, and adhesive property may be reduced due to homopolymer production during polymerization. Thus, depending on the desired dicyclopentadiene-based resin, the content of the aromatic olefin-based comonomer may be controlled by controlling the range of the weight ratio.

The monomer composition may be used in a state where the monomer composition is dissolved in a solvent, and the solvent may be any solvent commonly used in the art to which the present invention pertains. For example, a solvent such as pentane, hexane, heptane, nonane, decane, benzene, toluene, xylene, etc. may be used, but the present invention is not limited thereto.

The monomer composition may further include an additive commonly used in the art to which the present invention pertains, such as an antioxidant and a polymerization inhibitor.

The first polymerization step may be performed at a reaction temperature ($t_1$) of 210° C. to 270° C. while stirring the monomer composition.

According to one embodiment of the present invention, the first polymerization step may be carried out in a continuous stirred tank reactor (CSTR). CSTR is one of continuous reactors and has advantages that it is possible to continuously inject reactants, to provide a mixing effect during reaction, to keep the temperature constant during reaction, and to lower the probability of local hot spots. However, CSTR has disadvantages that a conversion rate of the reactants per reactor volume is low, and the molecular weight distribution of the resin is broadened due to the remaining polymer not discharged within a residence time.

Further, a plug flow reactor (PFR), another continuous reactor, has advantages that the reactor has no stirrer, and thus maintenance and management of the reactor is relatively easy, and a conversion rate per reactor volume is high. However, the reactor has disadvantages that it is difficult to control the temperature in the reactor, and when the reaction is exothermic, there is high probability of local hot spots.

According to one embodiment of the present invention, polymerization of dicyclopentadiene and the aromatic olefin-based comonomer may be carried out in two stages, and the first polymerization step may be carried out in CSTR and the second polymerization step described below may be carried out in PFR. Through each step of the polymerization, it is possible to prepare the high-quality dicyclopentadiene-based resin by inhibiting broadening of the molecular weight distribution while maintaining high productivity.

The CSTR used in the first polymerization step may be any CSTR commonly used in the art to which the present invention pertains, and polymerization may be performed while continuously injecting and mixing the monomer composition.

According to one embodiment of the present invention, the reaction temperature ($t_1$) of the first polymerization step may be controlled from 210° C. to 270° C. or from 220° C. to 270° C.

If the reaction temperature is too low, the reaction may not sufficiently occur, and if the reaction temperature is too high, side reactions such as crosslinking reaction, etc. may be generated. In this point of view, the reaction temperature is preferably controlled within the above-described range.

Further, a reaction pressure of the first polymerization step may be 1 bar to 40 bar, or 5 bar to 35 bar, or 10 bar to 30 bar. If the reaction pressure is too low, the reactivity may be lowered by vaporized monomers, and if the reaction pressure is too high, there is a high risk of accident. In this point of view, the reaction pressure is preferably controlled within the above-described range.

Further, a reaction time of the first polymerization step may be 10 minutes to 90 minutes, or 20 minutes to 80 minutes, or 30 minutes to 70 minutes. If the reaction time is too short, inhibition of side reactions by mixing of the raw material may be insufficient, and if the reaction time is too long, productivity of the final resin is decreased, and the molecular weight distribution may be broadened. In this point of view, the reaction time is preferably controlled within the above-described range.

The first polymerization step may be carried out until the conversion rate of dicyclopentadiene in the monomer composition reaches 5% to 70%, or 10% to 60%, or 15% to 50%. The conversion rate of dicyclopentadiene may be calculated as a percentage of the consumption amount to the injection amount of the dicyclopentadiene per unit time, and may be determined by measuring a dry weight of the produced resin relative to the weight of the injected raw material.

If the conversion rate of dicyclopentadiene in the first polymerization step is too low, the subsequent second polymerization step may be burdened and a resin having a sufficient polymerization degree may not be produced. If the conversion rate is too high, the molecular weight and the molecular weight distribution of the dicyclopentadiene-based resin may be greatly increased, which is undesirable. In this point of view, the first polymerization step may be carried out only until the conversion rate of dicyclopentadiene reaches the above-described range.

Next, the reaction products of the first polymerization step may be subjected to the second polymerization in a separate reactor which is connected to the reactor used in the first polymerization step.

According to one embodiment of the present invention, the second polymerization may be carried out in a plug flow reactor (PFR). The PFR may be connected to CSTR where the first polymerization step is carried out. Accordingly, the reaction products of the first polymerization step may be injected into PFR, and thus continuous polymerization may occur.

As described above, PFR is a reactor having no internal stirrer, and has an advantage that the conversion rate of the monomer per volume of the reactor is high. However, stirring is insufficient, and thus there is probability of generation of local hot spots and side reaction caused thereby.

However, in the present invention, the polymerization of the monomer composition is not carried out from the beginning in PFR, but the reaction products polymerized at a predetermined polymerization degree through the first polymerization step are subjected to the second polymerization step. Therefore, due to reduction in the heat of polymerization reaction, generation of local hot spots may be prevented, and as a result, the dicyclopentadiene resin having a narrow molecular weight distribution may be prepared.

The PFR used in the second polymerization may be any PFR commonly used in the art to which the present invention pertains. In the PFR, polymerization may be carried out while being continuously provided with the reaction products of the first polymerization.

According to one embodiment of the present invention, a reaction temperature ($t_2$) of the second polymerization may be in the range of the reaction temperature ($t_1$) of the first polymerization ±30° C., i.e., in the range of $t_1$−30° C. to $t_1$+30° C., or $t_1$−20° C. to $t_1$+20° C., or $t_1$-15 to $t_1$+15° C., or $t_1$−10 to $t_1$+10° C.

The reaction temperature ($t_2$) of the second polymerization may be determined within the above range, thereby inhibiting side reactions and obtaining the effect of high productivity. That is, if the difference between $t_2$ and $t_1$ is too large, productivity may be lowered. Therefore, the difference between $t_2$ and $t_1$ is preferably controlled within the above-described range.

More preferably, the reaction temperature ($t_2$) of the second polymerization may be controlled in the range from $t_1$ to $t_1$+20° C., or $t_1$ to $t_1$+15° C. When the reaction temperature of the second polymerization is controlled as above, production of unreacted oligomers is minimized, thereby obtaining the dicyclopentadiene-based resin having a high softening point and a narrow molecular weight distribution.

Further, the reaction pressure of the second polymerization may be 1 bar to 40 bar, or 5 bar to 35 bar, or 10 bar to 30 bar. If the reaction pressure is too low, generation of a dead zone or change of a residence time may occur due to vaporized monomers. If the reaction pressure is too high, a safety issue may arise in the process. In this point of view, the reaction pressure is preferably controlled within the above-described range.

Further, the reaction time of the second polymerization may be 1 to 4 times, 1 to 3 times, or 1 to 2 times the reaction time of the first polymerization. If the reaction time is too short, as compared with the reaction time of the first polymerization, the reaction may not occur sufficiently, and if the reaction time is too long, side reactions may occur. In this point of view, the reaction time is preferably controlled within the above-described range.

Further, an internal volume of the PFR used in the second polymerization may be 1 to 3 times, or 1 to 2.5 times, or 1 to 2 times an internal volume of the CSTR used in the first polymerization. If the internal volume of the PFR is too small, as compared with the internal volume of the CSTR, the polymerization may not occur sufficiently in the PFR, and as a result, a large amount of impurities such as wax may remain therein. If the internal volume of the PFR is too large, as compared with the internal volume of the CSTR, the effects obtained by using the CSTR reactor are unsatisfactory, and control of the initial reaction heat is insufficient, and thus it is difficult to control the reaction temperature. In this point of view, the internal volume of PFR is preferably controlled within the above-described range.

According to the method of preparing the dicyclopentadiene-based resin of the present invention, relatively high yield of about 50% or more, or about 60% or more, or about 65% or more may be achieved despite the relatively short reaction time, and the narrow molecular weight distribution may also be achieved.

The dicyclopentadiene-based resin prepared as above may satisfy the following Equation 1:

$$0.1 < PDI - 1.45*n < 1.3 \quad \text{[Equation 1]}$$

wherein PDI represents a molecular weight distribution of the dicyclopentadiene-based resin, and n represents a weight ratio of the aromatic olefin-based comonomer in the monomer composition (a weight of the aromatic olefin-based comonomer/a total weight of the monomer composition).

In Equation 1, when PDI−1.45*n is expressed as z, it may satisfy 0.1<z<1.3, or 0.3<z<1.3, or 0.5<z<1.3, or 0.5<z<1.25, or 0.8<z<1.25, or 1.0<z<1.25.

Further, the dicyclopentadiene-based resin may have a Z-average molecular weight (Mz) of 100 g/mol to 5,000 g/mol, or 300 g/mol to 4,500 g/mol, or 500 g/mol to 4,000 g/mol.

Further, the dicyclopentadiene-based resin may have a weight average molecular weight (Mw) of 100 g/mol to 3,000 g/mol, or 200 g/mol to 2,500 g/mol, or 300 g/mol to 2,000 g/mol.

Further, the dicyclopentadiene-based resin may have a number average molecular weight (Mn) of 100 g/mol to 1,200 g/mol, or 150 g/mol to 1,000 g/mol, or 200 g/mol to 800 g/mol.

Further, the dicyclopentadiene-based resin may have a molecular weight distribution (PDI, Mw/Mn) of 2.5 or less, more specifically, 1.0 or more, or 1.2 or more, or 1.4 or more and 2.5 or less, or 2.4 or less, or 2.2 or less, or 1.8 or less.

Owing these characteristics, the dicyclopentadiene-based resin may be mixed with other polymers to provide a hot melt adhesive/sticking agent showing excellent adhesive strength. In particular, the dicyclopentadiene-based resin may function as a tackifying resin for polymers having many different physical properties, and therefore, it is expected that the dicyclopentadiene-based resin may be used in a wide variety of fields.

The dicyclopentadiene-based resin obtained by the above-described method may be further subjected to hydrogenation reaction. The hydrogenation reaction may be performed by a method known in the art to which the present invention pertains. For example, the dicyclopentadiene-based resin obtained by the first and second polymerization reactions may be fed into a continuous hydrogenation reactor which is packed with a hydrogenation catalyst, and then the hydrogenation reaction may be carried out in the reactor.

Hereinafter, the actions and effects of the present invention will be described in more detail with reference to the specific examples. However, these examples are for illustrative purposes only, and the scope of the present invention is not intended to be limited by these examples.

EXAMPLE

Example 1

750 g of dicyclopentadiene and 750 g of styrene were mixed in 1500 g of a xylene solvent to prepare a monomer composition.

While the monomer composition was continuously fed into a CSTR (internal volume: 0.416 L), a first polymerization step (reaction time: 42 minutes) was performed under conditions of a temperature of 260° C. and a pressure of 25 bar.

While reaction products of the first polymerization step were continuously fed into a PFR (internal volume: 0.590 L) connected to the CSTR, a second polymerization step (reaction time: 63 minutes) was performed under conditions of a temperature of 270° C. and a pressure of 25 bar.

After completion of the polymerization, a product was depressurized at 200° C. for 30 minutes to recover a dicyclopentadiene-based resin.

Example 2

1050 g of dicyclopentadiene and 450 g of styrene were mixed in 1500 g of a xylene solvent to prepare a monomer composition.

While the monomer composition was continuously fed into a CSTR (internal volume: 0.416 L), a first polymerization step (reaction time: 36 minutes) was performed under conditions of a temperature of 260° C. and a pressure of 25 bar.

While reaction products of the first polymerization step were continuously fed into a PFR (internal volume: 0.590 L) connected to the CSTR, a second polymerization step (reaction time: 54 minutes) was performed under conditions of a temperature of 270° C. and a pressure of 25 bar.

After completion of the polymerization, a product was depressurized at 200° C. for 30 minutes to recover a dicyclopentadiene-based resin.

Example 3

450 g of dicyclopentadiene and 1050 g of styrene were mixed in 1500 g of a xylene solvent to prepare a monomer composition.

While the monomer composition was continuously fed into a CSTR (internal volume: 0.416 L), a first polymerization step (reaction time: 42 minutes) was performed under conditions of a temperature of 260° C. and a pressure of 25 bar.

While reaction products of the first polymerization step were continuously fed into a PFR (internal volume: 0.590 L) connected to the CSTR, a second polymerization step (reaction time: 63 minutes) was performed under conditions of a temperature of 270° C. and a pressure of 25 bar.

After completion of the polymerization, a product was depressurized at 200° C. for 30 minutes to recover a dicyclopentadiene-based resin.

Examples 4 to 6

A dicyclopentadiene-based resin was polymerized in the same manner as in Example 1, except that the reaction temperature of the first polymerization step was different from that of the second polymerization step in Example 1.

Example 7

A dicyclopentadiene-based resin was polymerized in the same manner as in Example 2, except that the reaction temperature of the second polymerization step was changed in Example 2.

Example 8

With respect to the total weight of the dicyclopentadiene-based resin of Example 1, 0.5 wt % of Pd catalyst and 4 NL/min of hydrogen were used to perform a hydrogenation reaction under conditions of a temperature of 260° C. and a pressure of 100 bar twice.

Example 9

750 g of dicyclopentadiene and 750 g of C9-based monomers (in the total amount, styrene, alpha-methyl styrene, vinyl toluene, indene, and methyl indene were included at a weight ratio of 40%, and dicyclopentadiene was included in a remaining amount) were mixed in 1500 g of a xylene solvent to prepare a monomer composition.

While the monomer composition was continuously fed into a CSTR (internal volume: 0.416 L), a first polymerization step (reaction time: 40 minutes) was performed under conditions of a temperature of 260° C. and a pressure of 25 bar.

While reaction products of the first polymerization step were continuously fed into a PFR (internal volume: 0.590 L) connected to the CSTR, a second polymerization step (reaction time: 60 minutes) was performed under conditions of a temperature of 270° C. and a pressure of 25 bar.

After completion of the polymerization, a product was depressurized at 200° C. for 30 minutes to recover a dicyclopentadiene-based resin.

Comparative Example 1

750 g of dicyclopentadiene and 750 g of styrene were mixed in 1500 g of a xylene solvent to prepare a monomer composition.

While the monomer composition was continuously fed into a PFR (internal volume: 0.295 L), a first polymerization step (reaction time: 52 minutes) was performed under conditions of a temperature of 260° C. and a pressure of 25 bar.

Reaction products of the first polymerization step were subjected to a second polymerization step (reaction time: 53 minutes) in the same PFR (internal volume: 0.295 L) connected to the PFR under conditions of a temperature of 270° C. and a pressure of 25 bar.

After completion of the polymerization, a product was depressurized at 200° C. for 30 minutes to recover a dicyclopentadiene-based resin.

Comparative Example 2

1050 g of dicyclopentadiene and 450 g of styrene were mixed in 1500 g of a xylene solvent to prepare a monomer composition.

While the monomer composition was continuously fed into a PFR (internal volume: 0.295 L), a first polymerization step (reaction time: 45 minutes) was performed under conditions of a temperature of 260° C. and a pressure of 25 bar.

Reaction products of the first polymerization step were subjected to a second polymerization step (reaction time: 45 minutes) in the same PFR (internal volume: 0.295 L) connected to the PFR under conditions of a temperature of 270° C. and a pressure of 25 bar.

After completion of the polymerization, a product was depressurized at 200° C. for 30 minutes to recover a dicyclopentadiene-based resin.

Comparative Example 3

1050 g of dicyclopentadiene and 450 g of styrene were mixed in 1500 g of a xylene solvent to prepare a monomer composition.

While the monomer composition was continuously fed into a PFR (internal volume: 0.295 L), a first polymerization step (reaction time: 40 minutes) was performed under conditions of a temperature of 260° C. and a pressure of 25 bar.

Reaction products of the first polymerization step were subjected to a second polymerization step (reaction time: 40 minutes) in the same PFR (internal volume: 0.295 L) connected to the PFR under conditions of a temperature of 270° C. and a pressure of 25 bar.

After completion of the polymerization, a product was depressurized at 200° C. for 30 minutes to recover a dicyclopentadiene-based resin.

Comparative Example 4

450 g of dicyclopentadiene and 1050 g of styrene were mixed in 1500 g of a xylene solvent to prepare a monomer composition.

While the monomer composition was continuously fed into a PFR (internal volume: 0.295 L), a first polymerization step (reaction time: 45 minutes) was performed under conditions of a temperature of 260° C. and a pressure of 25 bar.

Reaction products of the first polymerization step were subjected to a second polymerization step (reaction time: 45 minutes) in the same PFR (internal volume: 0.295 L) connected to the PFR under conditions of a temperature of 270° C. and a pressure of 25 bar.

After completion of the polymerization, a product was depressurized at 200° C. for 30 minutes to recover a dicyclopentadiene-based resin.

Comparative Example 5

750 g of dicyclopentadiene (available source: Baorun Chemical) and 750 g of styrene were mixed in 1500 g of a xylene solvent to prepare a monomer composition.

While the monomer composition was continuously fed into a CSTR (internal volume: 0.416 L), a first polymerization step (reaction time: 48 minutes) was performed under conditions of a temperature of 260° C. and a pressure of 25 bar.

Reaction products of the first polymerization step were subjected to a second polymerization step (reaction time: 72 minutes) in the same CSTR connected to the CSTR under conditions of a temperature of 270° C. and a pressure of 25 bar.

After completion of the polymerization, a product was depressurized at 200° C. for 30 minutes to recover a dicyclopentadiene-based resin.

Comparative Example 6

The dicyclopentadiene-based resin of Comparative Example 1 was subjected to a hydrogenation reaction in the same manner as in Example 8.

Comparative Example 7

The dicyclopentadiene-based resin of Comparative Example 5 was subjected to a hydrogenation reaction in the same manner as in Example 8.

Comparative Example 8

750 g of dicyclopentadiene and 750 g of the same C9-based monomers as in Example 9 were mixed in 1500 g of a xylene solvent to prepare a monomer composition.

While the monomer composition was continuously fed into a CSTR (internal volume: 0.416 L), a first polymerization step (reaction time: 45 minutes) was performed under conditions of a temperature of 260° C. and a pressure of 25 bar.

While reaction products of the first polymerization step were continuously fed into a CSTR (internal volume: 0.416 L) connected to the CSTR, a second polymerization step (reaction time: 45 minutes) was performed under conditions of a temperature of 270° C. and a pressure of 25 bar.

After completion of the polymerization, a product was depressurized at 200° C. for 30 minutes to recover a dicyclopentadiene-based resin.

The reaction conditions of Examples and Comparative Examples are summarized in the following Table 1.

TABLE 1

| | Reaction conditions of first step | | Reaction conditions of second step | | Weight ratio(n) of aromatic olefin-based comonomer |
|---|---|---|---|---|---|
| | Reactor | Reaction temperature and time | Reactor | Reaction temperature and time | |
| Example 1 | CSTR | 260° C., 42 min | PFR | 270° C., 63 min | 0.5 |
| Example 2 | CSTR | 260° C., 36 min | PFR | 270° C., 54 min | 0.3 |
| Example 3 | CSTR | 260° C., 42 min | PFR | 270° C., 63 min | 0.7 |
| Example 4 | CSTR | 260° C., 42 min | PFR | 260° C., 63 min | 0.5 |
| Example 5 | CSTR | 270° C., 42 min | PFR | 260° C., 63 min | 0.5 |
| Example 6 | CSTR | 270° C., 42 min | PFR | 270° C., 63 min | 0.5 |
| Example 7 | CSTR | 260° C., 36 min | PFR | 260° C., 54 min | 0.3 |
| Example 9 | CSTR | 260° C., 40 min | PFR | 270° C., 60 min | 0.2 |
| Comparative Example 1 | PFR | 260° C., 52 min | PFR | 270° C., 53 min | 0.5 |
| Comparative Example 2 | PFR | 260° C., 45 min | PFR | 270° C., 45 min | 0.3 |
| Comparative Example 3 | PFR | 260° C., 40 min | PFR | 270° C., 40 min | 0.3 |
| Comparative Example 4 | PFR | 260° C., 45 min | PFR | 270° C., 45 min | 0.7 |
| Comparative Example 5 | CSTR | 260° C., 48 min | CSTR | 270° C., 72 min | 0.5 |
| Comparative Example 8 | CSTR | 260° C., 45 min | CSTR | 270° C., 45 min | 0.2 |

Experimental Example

Evaluation of Physical Properties of Resins

A Z-average molecular weight (Mz), a weight average molecular weight (Mw), a number average molecular weight (Mn), and a molecular weight distribution (PDI, Mw/Mn)

were measured for the dicyclopentadiene-based resins prepared in Examples and Comparative Examples, and shown in the following Table 2.

TABLE 2

| | Mw (g/mol) | Mn (g/mol) | Mz (g/mol) | PDI | Weight ratio(n) of aromatic olefin-based co-monomer | PDI - 1.45 *n | Yield (%) |
|---|---|---|---|---|---|---|---|
| Example 1 | 1,000 | 532 | 2,148 | 1.88 | 0.5 | 1.155 | 71 |
| Example 2 | 724 | 430 | 1,494 | 1.68 | 0.3 | 1.245 | 65 |
| Example 3 | 1,425 | 655 | 3,121 | 2.17 | 0.7 | 1.155 | 74 |
| Example 4 | 1,087 | 606 | 2,252 | 1.79 | 0.5 | 1.065 | 63 |
| Example 5 | 966 | 579 | 1,864 | 1.66 | 0.5 | 0.935 | 65 |
| Example 6 | 1,009 | 628 | 1,963 | 1.60 | 0.5 | 0.875 | 69 |
| Example 7 | 643 | 374 | 1,437 | 1.72 | 0.3 | 1.285 | 60 |
| Example 9 | 543 | 364 | 1,093 | 1.49 | 0.2 | 1.2 | 58 |
| Comparative Example 1 | 1,285 | 537 | 4,081 | 2.39 | 0.5 | 1.665 | 70 |
| Comparative Example 2 | 806 | 447 | 2,086 | 1.80 | 0.3 | 1.365 | 60 |
| Comparative Example 3 | 804 | 451 | 2,031 | 1.76 | 0.3 | 1.325 | 59 |
| Comparative Example 4 | 2,286 | 724 | 7,212 | 3.14 | 0.7 | 2.125 | 60 |
| Comparative Example 5 | 1,000 | 488 | 2,324 | 2.05 | 0.5 | 1.325 | 62 |
| Comparative Example 8 | 597 | 368 | 1,369 | 1.62 | 0.2 | 1.33 | 55 |

Referring to Table 1, it can be seen that the dicyclopentadiene-based resins of Examples of the present invention showed a narrow molecular weight distribution and high yield, as compared with the dicyclopentadiene-based resins of Comparative Examples having the same weight ratio of the aromatic olefin-based comonomer.

Particularly, considering Comparative Examples 1 and 5, in which during the first and second reaction steps, the reaction temperature and the weight ratio of the aromatic olefin-based comonomer were the same as in Example 1, but the reactor configurations were different from those of Example 1, the dicyclopentadiene-based resin of Example 1 had a molecular weight distribution of 1.88 whereas those of Comparative Examples 1 and 5 had a molecular weight distribution of 2 or more, indicating that whether stirring is performed or not in the first and second reaction steps may greatly influence the molecular weight distribution.

In Example 9, when the C9-based monomers less reactive than the aromatic olefin-based monomer were used, the dicyclopentadiene-based resin also showed a very narrow molecular weight distribution of less than 1.5 and a high yield of 58%. However, although the same C9-based monomers were used in Comparative Example 8, the dicyclopentadiene-based resin showed a molecular weight distribution of more than 1.5 and a lower yield that that of Example 9.

In addition, the dicyclopentadiene-based resins of Examples showed PDI–1.45*n (n represents a weight ratio of the aromatic olefin-based comonomer in the monomer composition (a weight of the aromatic olefin-based comonomer/a total weight of the monomer composition) of less than 1.3, whereas the dicyclopentadiene-based resins of Comparative Examples showed PDI–1.45*n of more than 1.3.

Evaluation of Adhesive Strength of Resins

In order to evaluate adhesive strengths of the dicyclopentadiene-based hydrogenated resins prepared in Example 8 and Comparative Examples 6 and 7, 25 parts by weight of SBS (Styrene/Butadiene/Styrene) resin, 57 parts by weight of the dicyclopentadiene-based hydrogenated resin, and 18 parts by weight of a paraffin oil plasticizer were mixed, and 0.5 parts by weight of an antioxidant was added thereto to prepare an adhesive composition.

The adhesive composition was applied onto a 100 μm PET film, of which surface had been corona-treated, in a wet thickness of about 36 μm with an automatic coater. The coated film was dried at 100° C. for 30 minutes to remove the solvent, and a universal material tester, FT-1 of LLOYD was used to perform 180° peel strength and loop tack tests.

The results of measuring the adhesive strengths and the softening points of the respective hydrogenated resins are shown in the following Table 3.

TABLE 3

| | Peel strength (kgf/25 mm) | Tack Force (kgf) | Softening point (° C.) |
|---|---|---|---|
| Example 8 | 1.09 | 1.61 | 110 |
| Comparative Example 6 | 0.94 | 1.21 | 110 |
| Comparative Example 7 | 1.07 | 1.459 | 109 |

Referring to Table 3, the dicyclopentadiene-based hydrogenated resin of Example 8 showed improved adhesive strength, as compared with the dicyclopentadiene-based hydrogenated resins of Comparative Examples 6 and 7.

What is claimed is:

1. A method of preparing a dicyclopentadiene-based resin, the method comprising:
    a first polymerization step of performing a polymerization process of a monomer composition including dicyclopentadiene and an aromatic olefin-based comonomer at a weight ratio of 90:10 to 10:90 under stirring; and
    a second polymerization step of performing a polymerization process of reaction products of the first polymerization step without stirring,
    wherein the first polymerization step is performed in a continuous stirred tank reactor (CSTR), and the second polymerization step is performed in a plug flow reactor (PFR).

2. The method of claim 1, wherein the aromatic olefin-based comonomer are selected from a group consisting of styrene, indene, a C9-based monomer, and a mixture thereof.

3. The method of claim 1, wherein a reaction temperature ($t_1$) of the first polymerization step is 210° C. to 270° C. and a reaction temperature ($t_2$) of the second polymerization step is $t_1 \pm 30°$ C.

4. The method of claim 1, wherein the dicyclopentadiene-based resin satisfies the following Equation 1:

$$0.1 < PDI - 1.45*n < 1.3 \quad \text{[Equation 1]}$$

wherein PDI represents a molecular weight distribution of the dicyclopentadiene-based resin, and
    n represents a weight ratio of the aromatic olefin-based comonomer in the monomer composition (a weight of the aromatic olefin-based comonomer/a total weight of the monomer composition).

5. The method of claim 1, wherein the first polymerization step is performed until a conversion rate of dicyclopentadiene reaches 5% to 70%.

6. The method of claim 1, wherein a reaction time of the first polymerization step is 10 minutes to 90 minutes, and a reaction time of the second polymerization step is 1 to 2 times the reaction time of the first polymerization step.

7. The method of claim 1, wherein an internal volume of the plug flow reactor is 1 to 3 times an internal volume of the continuous stirred tank reactor.

8. The method of claim 1, wherein a hydrogenation process is further performed after the second polymerization step.

9. A dicyclopentadiene-based resin which is prepared by polymerization of a monomer composition including dicyclopentadiene and an aromatic olefin-based comonomer at a weight ratio of 90:10 to 10:90 and satisfies the following Equation 1:

$$0.1 < PDI - 1.45 * n < 1.3 \quad \text{[Equation 1]}$$

wherein PDI represents a molecular weight distribution of the dicyclopentadiene-based resin and is a ratio of a weight average molecular weight (Mw) to a number average molecular weight (Mn) (Mw/Mn), and n represents a weight ratio of the aromatic olefin-based comonomer in the monomer composition (a weight of the aromatic olefin-based comonomer/a total weight of the monomer composition), and wherein the molecular weight distribution (PDI, Mw/Mn) of the dicyclopentadiene-based resin is 1.68 or less.

10. The dicyclopentadiene-based resin of claim 9, wherein a Z-average molecular weight (Mz) is 100 g/mol to 5,000 g/mol, the weight average molecular weight (Mw) is 100 g/mol to 3,000 g/mol, and the number average molecular weight (Mn) is 100 g/mol to 1,200 g/mol.

11. The dicyclopentadiene-based resin of claim 9, wherein the molecular weight distribution (PDI, Mw/Mn) is 1.49 to 1.68.

* * * * *